United States Patent [19]

Willard, Sr.

[11] 3,893,943

[45] July 8, 1975

[54] NOVEL CATALYST AND PROCESS FOR PREPARING THE SAME

[75] Inventor: John W. Willard, Sr., Rapid City, S. Dak.

[73] Assignee: CAW Industries, Inc., Rapid City, S. Dak.

[22] Filed: Dec. 20, 1972

[21] Appl. No.: 317,097

Related U.S. Application Data

[63] Continuation of Ser. No. 108,198, Jan. 20, 1971, abandoned.

[52] U.S. Cl. ............... 252/428; 252/451; 252/452; 252/453; 252/455 R; 252/457; 44/1 R; 208/8
[51] Int. Cl. ..................... B01j 11/32; B01j 11/40
[58] Field of Search..... 252/428, 449, 429 B, 313 S, 252/532, 451, 457, 454, 455 R, , 452, 453; 44/1 R; 208/8

[56] References Cited
UNITED STATES PATENTS

| | | | |
|---|---|---|---|
| 3,272,753 | 9/1966 | Wixon | 252/532 X |
| 3,350,319 | 10/1967 | Schonfeldt | 252/532 X |
| 3,351,558 | 11/1967 | Zimmerer | 252/532 X |
| 3,377,293 | 4/1968 | Shepard | 252/313 S |
| 3,453,144 | 7/1969 | Morgan et al. | 252/532 X |
| 3,657,151 | 4/1972 | Noble | 252/453 X |

*Primary Examiner*—Carl F. Dees
*Attorney, Agent, or Firm*—L. S. Van Landingham, Jr.

[57] ABSTRACT

A novel catalyst is prepared by steps including admixing a water soluble alkali metal silicate with an aqueous medium containing carefully controlled amounts of dissolved water soluble substances which are sources of calcium ion and magnesium ion, and reacting the same to produce an aqueous finely divided suspension of the reaction product. A micelle-forming surfactant is admixed with the aqueous medium, and the aqueous medium containing the finely divided particles of the reaction product and the surfactant is agitated to form catalyst micelles. The invention further provides the novel catalyst prepared by the process of the invention. A wide variety of carbonaceous materials having active sites may be reacted with water and/or the constituents thereof in the presence of the catalyst to produce novel products.

39 Claims, No Drawings

3,893,943

NOVEL CATALYST AND PROCESS FOR PREPARING THE SAME

This is a continuation, of application Ser. No. 108,198, filed Jan. 20, 1971, now abandoned.

BACKGROUND OF THE INVENTION

This invention broadly relates to a novel catalyst, in some of its more specific aspects, the present invention is concerned with a novel catalyst which is especially useful in treating carbonaceous materials with water and/or the constituents thereof and a process for preparing the same.

When treating carbonaceous materials in a number of prior art processes, it is necessary to use expensive chemical reagents and/or resort to vigorous processing conditions such as high temperatures and pressures. Examples of processes of this type include the oxidation of carbonaceous materials, the fixation of elemental nitrogen, coking or carbonization, the preparation of activated carbon and charcoal, destructive distillation, hydrogenation, hydrodesulfurization, the treatment of carbonaceous fuels such as coal, lignite, peat and petroleum to remove sulfur, nitrogen and other substances which cause atmospheric pollution upon combustion, and the treatment of carbonaceous ores to recover metal values which are chemically bonded to carbon in relatively low concentrations. In other prior art processes, strong detergents and other chemicals have been used to remove or separate carbonaceous materials from various types of substrates. Examples of the latter processes include the removal of burned on carbon from jet aircraft engines and metallic surfaces in general, and the separation of carbonaceous materials from inorganic or mineral matter such as in the treatment of oil shale and bituminous sands, and in the secondary recovery of petroleum.

As a result of the requirements for expensive chemicals, vigorous processing conditions and/or heavy or complicated apparatus, it is costly and often uneconomic to practice prior art processes of the above types. However, in many instances there were no entirely satisfactory low cost processes available heretofore which utilize mild reaction conditions, only small amounts of inexpensive chemicals and readily available apparatus.

The present invention provides a catalyst which is capable of causing liquid water to exhibit very unusual and heretofore unknown properties in the presence of carbonaceous materials. Unexpectedly, widely differing results are obtained by treating carbonaceous materials with an aqueous suspension of the catalyst under varying reaction conditions. As a result, aqueous suspensions of the catalyst are useful in treating carbonaceous materials for numerous purposes.

In one variant of the invention, treating carbonaceous materials with an aqueous suspension of the catalyst produces pronounced chemical changes. For example, carbonaceous materials may be oxidized to produce useful oxidation products such as carboxylic acids and hydroxycarboxylic acids. It is also possible to fix nitrogen by treating carbonaceous materials with an aqueous suspension of the catalyst in the presence of an atmosphere containing elemental nitrogen and thereby produce useful nitrogen-containing organic compounds. In other variants, carbonaceous fuels are treated to alter combustible sulfur, nitrogen and other deleterious substances to permit their removal by prior art techniques, and carbonaceous ores are treated to solubilize or otherwise render the metal values more susceptable to concentration by prior art techniques.

Often the treated carbonaceous materials undergo physical changes as well as chemical changes. For example, the internal chemical or physical bonds which bind carbonaceous materials such as coal may be ruptured by treating with an aqueous suspension of the catalyst. The treated carbonaceous material may be crushed, ground or otherwise reduced to a finely divided form with little effort. The bonds binding an external or surface portion of carbonaceous material to a different type of substrate also may be ruptured to thereby allow the treated carbonaceous material to be easily separated or removed from the substrate. Under still other conditions, it is possible to remove stains or discolorations and imbedded soil from fabrics, clothing and other types of carbonaceous materials.

Usually the above mentioned chemical and physical changes may be produced by intimately contacting the carbonaceous material to be treated with a liquid phase aqueous suspension of the novel catalyst under atmospheric pressure and at temperatures below the boiling point of water. Inasmuch as the catalyst is inexpensive and the aqueous suspension need contain only catalytic quantities and no other chemical reagents, the carbonaceous materials may be treated at very low cost. Expensive chemicals and vigorous processing conditions are not needed, and only a minimum amount of simple apparatus is needed to practice the process of the invention.

It is an object of the present invention to provide a novel catalyst.

It is a further object to provide a novel catalyst for use in treating carbonaceous materials with water and/or the constituents thereof.

It is a further object to provide a novel catalyst which is especially useful in preparing organic compounds by reacting water and/or the constituents thereof with carbonaceous materials having active sites.

It is a further object to provide a process for preparing the novel catalyst of the invention.

Still other objects and advantages of the invention will be apparent upon reference to the following detailed description and the examples.

DETAILED DESCRIPTION OF THE INVENTION INCLUDING PREFERRED VARIANTS THEREOF

In the presently preferred process for preparing a concentrated aqueous suspension of catalyst, a water soluble alkali metal silicate is admixed and reacted with an aqueous solution of a water soluble dissolved substance which is a source of calcium ion and a water soluble dissolved substance which is a source of magnesium ion to produce a finely divided suspension of the reaction product. The aqueous solution contains the dissolved substances initially in amounts to provide between about $1 \times 10^{-4}$ and $1 \times 10^{-1}$ mole per liter each of calcium ion and magnesium ion, and preferably between about $1 \times 10^{-3}$ and $1 \times 10^{-2}$ mole per liter. The dissolved substance should also be present in amounts to provide a molar ratio of calcium ion to magnesium ion between about 2.0:1.0 and 1.0:2.0, and preferably between about 1.5:1.0 and 1.0:1.5. For best results, the aqueous medium should contain the dissolved substances in amounts to provide between about $3 \times 10^{-3}$ and $6 \times 10^{-3}$ mole per liter each of calcium ion and magnesium ion, and the molar ratio of calcium ion to magnesium ion should be about 1.0:1.0. The alkali metal silicate should be admixed with the aqueous medium in an amount of about 0.05-2 moles per liter, and preferably about 0.1-1 mole per liter. For best results, the alkali metal silicate should be alkali metal metasilicate and have an alkali metal oxide to silicon dioxide ratio of about 1:1, and it should be admixed with the aqueous medium in an amount to provide about 0.2-0.5 mole per liter.

Examples of sources of calcium ion and magnesium ion for use in preparing the aqueous solution include mineral acid salts such as the halides, sulfates, bisulfates, nitrites and nitrates of calcium and magnesium. The chlorides are usually the preferred halides, and both calcium and magnesium chloride are soluble and may be used. Magnesium sulfate and bisulfate are soluble and often are the preferred sources of magnesium ion. Calcium sulfate is only slightly soluble in water and usually is not a preferred source of calcium ion, but calcium bisulfate is somewhat more soluble. While calcium and magnesium nitrite or nitrate are soluble in water and may be used, these substances are not preferred in most instances. The sources of calcium ion and magnesium ion are dissolved in the aqueous medium in amounts to provide calcium ion and magnesium ion within the above ranges. Complete ionization is assumed when calculating the quantities to be dissolved and any desired order of addition is satisfactory. For example, the source of calcium ion may be added to the aqueous medium before, during or after the source of magnesium ion.

The alkali metal silicate to be admixed with the aqueous medium is preferably a water soluble sodium or potassium silicate having an alkali metal oxide ($M_2O$) to silicon dioxide ($SiO_2$) mole ratio between about 0.9:1.0 and less than 2.0:1.0, and preferably between about 0.9:1.0 and 1.2:1.0. The best results are usually obtained with an alkali metal metasilicate having an alkali metal oxide to silicon dioxide ratio of about 1:1. Hydrated alkali metal silicates dissolve faster and should be used for best results when the alkali metal silicate is added in solid form. In instances where an anhydrous alkali metal silicate is used, it may be desirable to dissolve it in water and then add the solution to the aqueous medium. Sodium metasilicate is preferred and usually a hydrated sodium metasilicate such as the pentahydrate gives the best results.

In a further variant of the invention, at least one dissolved substance providing at least one amphoteric metal-containing ion is present in the aqueous medium at the time of reacting the alkali metal silicate with the substances providing calcium ion and magnesium ion. The substance or substances providing the amphoteric metal-containing ion or ions may be present, for example, in an amount sufficient to provide about 0.0001-1% and preferably about 0.01-0.5% by weight when calculated as the amphoteric metal oxide and based upon the weight of the alkali metal silicate. Preferred amphoteric metals include aluminum and/or zinc, and the preferred sources thereof include alkali metal aluminate and zincate of which sodium aluminate and/or zincate usually give the best results. The alkali metal aluminate and/or zincate may be added directly to the aqueous medium, or as the mineral acid salt, oxide and/or hydroxide which then forms the alkali metal aluminate and/or zincate under the highly alkaline conditions that exist.

Carbonate ion and/or bicarbonate ion should not be present in the aqueous medium in substantial concentrations as the calcium ion and magnesium ion are precipitated in the form of their respective carbonates. The free carbonate ion and/or bicarbonate ion concentrations in the aqueous medium should not exceed about 10 parts per million by weight based upon the combined weight of the water and the ingredients added thereto and for this reason, the alkali metal silicates should be substantially free of carbonate ion and bicarbonate ion. A small amount of precipitated calcium carbonate and/or magnesium carbonate may be present in the aqueous medium provided additional calcium ion and magnesium ion are available to meet the above defined concentrations.

Distilled water and/or deionized water are usually preferred over a natural or untreated water when preparing the aqueous medium. In instances where water is used which contains substantial initial concentrations of alkaline earth metal ions, then this should be taken into consideration in calculating the amounts of the sources of calcium ion and magnesium ion necessary to arrive at the final concentrations previously discussed. Surprisingly, an aqueous suspension of catalyst which was used previously in treating carbonaceous materials in the process of the invention produces a more active catalyst than either distilled water or deionized water. In one preferred variant of the invention, spent aqueous catalyst suspension is recycled indefinitely in a process for treating carbonaceous materials with periodic additions of the chemicals necessary to maintain the desired concentration of the catalyst.

An electrolyte which aids in the preparation of colloidal suspensions may be present in the aqueous medium at the time of admixing the alkali metal silicate therewith. Examples of electrolytes include those used in preparing prior art colloidal suspensions such as the alkali metal halides, sulfates and bisulfates. Sodium chloride, sodium sulfate and sodium bisulfate are usually preferred. The electrolyte should be added in small amounts such as, for example, about 0.00001-0.1 mole per liter, but often larger or smaller amounts may be present.

The conditions under which the alkali metal silicate is admixed with the aqueous medium and reacted with the sources of calcium ion and magnesium ion are not critical provided the reaction mixture is maintained in the liquid phase. The reaction temperature may be, for example, between the freezing point and boiling point of water under the existing pressure conditions. At atmospheric pressure, the temperature is usually about 10°-90°C. In many instances, ambient or normal room temperature is satisfactory.

The degree of agitation is not critical, and mild to vigorous agitation may be employed during addition of the alkali metal silicate. For the best results, the aqueous medium should be agitated sufficiently to assure rapid and uniform admixing of the alkali metal silicate. After completing the addition of the alkali metal silicate, when desired the agitation may be continued for a sufficient period of time to assure complete reaction and aging of the resulting colloidal suspension, such as for approximately 1-5 minutes to one hour or longer.

Upon admixing the alkali metal silicate with the aqueous medium, it takes on a turbid or milky appearance but in most instances no significant amount of a precipitate visible to the unaided eye is formed. Most of the reaction product appears to be present in the aqueous medium in the form of a colloidal suspension and/or as a suspension of very small particles, some of which are visible in a light microscope. The suspension of the finely divided particles of the reaction product thus produced should be strongly basic and may have a pH value of, for example, approximately 10–14 and preferably about 11–13, and for best results about 12. In view of this, the initial pH value of the aqueous medium containing the dissolved sources of calcium ion and magnesium ion is of importance and should be about 6–9 and preferably about 7–8. When necessary, it is possible to adjust the pH value of the aqueous medium to the foregoing levels either before, during or after addition of the alkali metal silicate by adding bases such as sodium or potassium hydroxide, or mineral acids such as sulfuric or hydrochloric acid.

The suspension of the reaction product may be stored for several weeks or longer while awaiting the further treatment described hereinafter. In instances where the suspension of the reaction product is to be stored over a substantial period of time, the pH value should be maintained at the above described level and the storage vessel is preferably a tightly capped polyethylene bottle or other inert plastic container which prevents the contents from absorbing carbon dioxide from the atmosphere.

The suspension of the finely divided particles of the reaction product is not suitable for use as a catalyst as prepared and it should be agitated sufficiently in the presence of a micelle-forming surfactant to form catalyst-containing micelles. The degree of agitation, the length of the agitation period, and the amount of the micelle-forming surfactant that is present in the suspension of the reaction product are controlled at levels favorable to the formation of micelles. For example, the surfactant may be present in an amount of about 0.01–1 mole per liter and preferably about 0.01–0.2 mole per liter. Smaller or larger amounts may be effective with some surfactants such as 0.001 mole per liter or less, or up to 2 moles per liter or more. About 0.03–0.1 mole per liter often gives the best results with many surfactants.

The minimum period of agitation and the minimum degree of agitation that are required for micelle formation varies somewhat with temperature and the type and amount of surfactant. As is well understood in this art, gradually increasing these variants in the presence of an effective amount of the micelle-forming surfactant will result in micelle formation when the proper levels are reached. As a general rule, longer periods of agitation and/or more vigorous agitation are required to form micelles at lower temperatures approaching the freezing point of the suspension of the reaction product than at higher temperatures approaching the boiling point. In instances where the aqueous suspension has a temperature of approximately 50°–90°C., then mild agitation over a period of about 10–60 minutes is satisfactory. Often longer or shorter periods of mild to vigorous agitation may be employed such as from about 1–5 minutes to several hours at temperatures varying, respectively, between the boiling point and the freezing point. When desired, the agitation may be continued long after the catalyst-containing micelles are formed as continued agitation does not seem to have an adverse affect.

As a general rule, the micelle-forming surfactants known in the prior art may be used in practicing the present invention. Micelle-forming surfactants used in the emulsion polymerization of monomeric organic compounds are disclosed in the text *Synthetic Rubber*, by G. S. Whitby, et al, John Wiley & Sons Incorporated, New York (1954), and surface active agents in general are disclosed on pages 418–424 of the text *Organic Chemistry*, Fieser and Fieser, 2nd Edition, Reinhold Publishing Corporation, New York, New York (1950), the disclosures of which are incorporated herein by reference. Examples of surfactants disclosed in the above texts include the alkali metal soaps of long chain fatty acids, and especially the sodium and potassium soaps of fatty acids containing about 14–25 carbon atoms and preferably about 16–18 carbon atoms, and the sodium and potassium soaps of the rosin acids, abietic acid and the derivatives thereof. Other surfactants include fats and oils such as corn oil, cotton seed oil, castor oil, soy bean oil and safflower oil which have been fully or partially saponified with alkali metal bases to produce mixtures including saponified long chain fatty acids, the mono- or di-glycerides thereof, and glycerin.

Examples of synthetic surfactants include the sulfonates of long chain alcohols prepared by hydrogenation of naturally ocurring fats and oils of the above types and especially sulfonated long chain alcohols containing about 10–20 and preferably about 12–14 carbon atoms, the alkali metal salts of the monosulfates of monoglycerides such as sodium glyceryl monolaurate sulfonate, the sulfonates of succinic acid esters such as dioctyl sodium sulfosuccinate and the alkylaryl alkali metal sulfonates. Specific examples of presently preferred surfactants include sodium and potassium sulforecineoleate, tetrahydronaphthalene sulfonate, octahydroanthracene sulfonic acid, butyl naphthalene sulfonic acid, sodium xylene sulfonate, alkyl benzene sulfonic acid and potassium benzene sulfonate.

Sulfated long chain hydroxycarboxylic acids containing about 14–25 carbon atoms and preferably about 16–18 carbon atoms, and sulfated fats and oils containing hydroxycarboxylic acids of this type produce exceptionally good micelle-forming surfactants. At least 25% of the hydroxyl groups and preferably at least 50% should be sulfated, and up to 95–100% may be sulfated. It is usually preferred that the sulfated oils and/or long chain hydroxycarboxylic acids be neutralized with an alkali metal base, and that the corresponding alkali metal salts be added to the suspension of the reaction product in the form of an aqueous solution. The aqueous solution may contain at least 25% of water and preferably at least 35–40% by weight. Much larger percentages of water may be present when desired such as 75–80% or more by weight.

A very active catalyst is produced when using sulfated castor oil as the miscelle-forming surfactant (Turkey Red oil). Sulfated castor oil which has been purified sufficiently to be of U.S.P. or medicinal grade produces an exceptionally active catalyst. For the best results, the castor oil is reacted with about an equal weight of concentrated sulfuric acid (e.g., 20% by weight) at a temperature of approximately 25°–30°C. The mixture may be reacted for about two hours with stirring and is then neutralized with sodium hydroxide solution. The reaction mixture separates into three layers, i.e., an upper layer which is a water solution, an intermediate or oily layer, and a white curdy precipitate. The intermediate oily layer is separated from the upper and lower layers, and is added to the suspension of the reaction product as the micelle-forming surfactant.

The activity of the catalyst may be increased very markedly by cooling the aqueous catalyst suspension to a temperature approaching the freezing point such as about 0°–10°C., and then warming over one or more cycles. For best results, the aqueous catalyst suspension should be frozen and thawed over one or more cycles. The reason for the increased catalytic activity is not fully understood at the present time but cooling and then warming the aqueous catalyst suspension seems to increase the concentration of the catalyst-containing micelles and/or increases the catalytic activity thereof.

The aqueous suspension of the catalyst contains a relatively small percentage by weight of the active catalyst as produced. When desired, it may be concentrated by evaporating a portion of the water to produce a concentrated liquid catalyst suspension which may be stored more conveniently. It is also possible to prepare a dry catalyst concentrate by evaporating substantially all of the water. The preferred method of producing the dry catalyst concentrate is by flash evaporation using a technique analogous to that employed in preparing powdered milk. The catalyst concentrates produced upon partial or complete evaporation of the water content of the initially prepared aqueous suspension may be reconstituted by addition of water with little or no loss of catalytic activity. Preferably, the water is added to the dry catalyst concentrate under sufficiently vigorous conditions of agitation to assure that the catalyst micelles are re-suspended and uniformly distributed.

The aqueous catalyst suspension may be used as produced for treating the carbonaceous materials, or it may be diluted with approximately 2–10,000 parts by weight and preferably with about 500–1,000 parts by weight of water and then used. It is only necessary that the carbonaceous material be treated with a liquid phase aqueous medium containing a catalytic amount of the catalyst. The aqueous medium may contain, for example, about 0.0001–0.3% by weight of the catalyst, but larger or smaller amounts may be present when desired. Preferably, the aqueous medium contains about 0.04–0.08% by weight of the catalyst, and often about 0.06% by weight gives the best results.

When the aqueous catalyst suspension is first contacted with the carbonaceous material, there is a period of activation during which there is little or no reaction. This activation period may be eliminated by treating the catalyst suspension with a small portion of the carbonaceous material prior to the reaction step, or by using a recycled catalyst solution from a previous treatment. In a preferred variant, all or part of the aqueous catalyst suspension is recycled so that a fully activated catalyst is always available for contacting with fresh carbonaceous material. The activated aqueous catalyst suspension has properties which differ substantially from those of the initially prepared aqueous suspension of catalyst, and thus is a different catalyst product.

The aqueous suspension of the catalyst is useful in treating a wide variety of carbonaceous materials having active carbon atoms or active sites. Carbonaceous materials of this type are often unsaturated, or contain an element other than carbon and hydrogen which is bonded directly to a carbon atom, or a carbon atom thereof is bonded to a dissimilar substrate. Examples of active sites include carbon-to-carbon double or triple bonds, carbon-to-oxygen bonds, carbon-to-sulfur bonds, carbon-to-nitrogen bonds, carbon-to-metal bonds, carbon attached to an electronegative group, and carbon bonded or otherwise attached or attracted to a dissimilar substrate. Specific examples of carbonaceous materials having active sites include solid carbonaceous fuels such as coal, lignite and peat, liquid carbonaceous fuels such as petroleum, carbonaceous ores, bituminous sands, oil sands, tar sands, oil shale and aromatic compounds such as toluene and xylene.

The catalyst of the present invention causes liquid water to exhibit very unusual and heretofore unrecognized properties in the presence of carbonaceous materials having active carbon atoms or sites. For example, the carbonaceous materials may be oxidized to produce useful oxidation products such as carboxylic acids and hydroxycarboxylic acids. It is also possible to fix nitrogen by treating the carbonaceous materials in the presence of an atmosphere containing elemental nitrogen. Coal, lignite and peat may be treated to permit removal of combustible sulfur, nitrogen and other deleterious substances by extraction with solvents or by other prior art techniques, and carbonaceous ores may be treated to render the metal values more susceptible to concentration by prior art techniques.

The carbonaceous materials are treated with the aqueous suspension of the catalyst under liquid phase conditions. The pH value of the aqueous catalyst suspension may vary between about 1 and 13.5 during the treatment. The temperature of treatment may vary between the freezing point and boiling points of water under the existing pressure conditions and may be, for example, about 0°–100°C. and preferably about 0°–10°C. at atmospheric pressure. High temperatures and/or pressures, or other extreme reaction conditions are not necessary, and inexpensive reaction vessels fitted with agitators and other simple equipment may be used. The aqueous catalyst suspension is intimately contacted with the carbonaceous material over a period of time sufficient to result in the desired reaction. The contact period usually varies from about 5 minutes to several hours, and often from about 15 minutes to 1 hour is sufficient. A much longer or shorter reaction time may be used as necessary to arrive at desired results.

Natural and synthetic textile materials in the form of thread, roving, woven and unwoven fabrics, clothing and the like may be treated with an aqueous suspension of the catalyst to remove deeply embedded soil, stains and discolorations in general which are not normally removed when using a conventional household laundry detergent. The textile materials may be treated with only an aqueous suspension of the catalyst, or the catalyst may be used in combination with a prior art laundry detergent. The textile materials may be washed in a standard household automatic washer in the presence of a catalytic amount of the catalyst and with or without a prior art laundry detergent. The recommended washing cycle for the specific textile material being treated is used in most instances.

The above described process for treating carbonaceous materials are intended to be merely exemplary in nature as the catalyst has numerous other uses. For instance, an aqueous suspension of the catalyst is useful as a general purpose household cleaning agent for removing dirt, grease and foreign materials in general from walls, floors and other surfaces. The aqueous catalyst suspension is also useful as an industrial cleaner for removing burned-on carbon deposits from, for example, aircraft and automobile engines, and for removing oil, grease, dirt and other deposits from industrial surfaces in general. In many instances, better results are obtained when an organic solvent is present in an amount of approximately 1–30% by weight and preferably about 10–20% by weight of the aqueous catalyst suspension as produced. Examples of organic solvents include normally liquid hydrocarbons, halogenated hydrocarbons, alcohols and ketones, and preferably those having about 6–20 carbon atoms. The solvent may be admixed with the aqueous catalyst suspension to form an emulsion-like mixture, and it seems to have a synergistic effect as heavy deposits may be removed more quickly and with less effort. Partially saponified fats and oils such as corn oil, soy bean oil, castor oil, and cotton seed oil also aid in removing heavy deposits and may be admixed with the catalyst suspension in amounts approximating those set out above for the solvent.

The invention is further illustrated by the following specific examples.

EXAMPLE I

This example illustrates one presently preferred process for preparing the catalyst of the invention.

Anhydrous calcium chloride in an amount of 0.66 gram and magnesium sulfate heptahydrate in an amount of 1.32 grams were dissolved in 2 liters of deionized water with stirring and warming until solution was complete. Then 95 grams of sodium silicate pentahydrate having a molecular ratio of sodium oxide to silicon dioxide of 1:1 was added to the solution with stirring and continued warming to produce a white suspension of finely divided particles of the reaction product. Most of the reaction product appeared to be present in the form of a colloidal suspension.

After setting for 10 minutes, the suspension of the reaction product was heated to 80°C. and 201 grams of sulfated castor oil was added with stirring. The average molecular weight of the sulfated castor oil was 400 and it contained 50% of water. The turbidity lessened somewhat as the suspension was heated at 80°–90°C. for 1 hour with vigorous stirring to produce catalyst micelles. The concentrated aqueous suspension of catalyst micelles thus prepared had a viscosity similar to that of water and it was used in Examples II and III appearing thereinafter.

The aqueous concentrate was useful as a catalyst in treating carbonaceous materials in general which have active sites. Catalyst costs were reduced by adding 2–1,000 parts of water before use. The diluted catalyst suspension was catalytically active and give satisfactory results.

A dry or solid catalyst concentrate was prepared in a further run by evaporating water from the aqueous catalyst suspension. The resulting catalyst concentrate was resuspended in water and there was no substantial loss of catalytic activity. In still other runs, the catalytic activity of the concentrated aqueous suspension of catalyst, the diluted aqueous suspension of catalyst, and the reconstituted aqueous catalyst suspension was enhanced by freezing and thawing.

EXAMPLE II

A portion of a concentrated suspension of catalyst prepared in accordance with Example I was diluted with 100 volumes of water. The resulting diluted catalyst suspension was used in treating small lumps of sub-bituminous coal in a ball mill.

The lumps of coal and the diluted catalyst suspension were fed to the ball mill at ambient temperature in the proportion of 1 pound of coal to one pound of catalyst suspension. The ball mill was rotated for 12 hours. Under these conditions, the coal lost its crystalline appearance and acquired the physical appearance and properties of weathered (oxidized) lignite or Leonardite.

Samples of the treated and untreated coal having about the same particle size were extracted with aqueous acetic acid and then with aqueous sodium hydroxide solution. The solubility of the treated coal was markedly greater than that of the original coal. It was apparent that treating the coal with the catalyst suspension changed the chemical composition and/or altered the bonds therein to produce both acid soluble and alkali soluble chemicals.

A portion of the treated coal was exposed to air for 1 hour at 100°C. The initial oxidation was carried further, and a mixture of water soluble acidic compounds such as phenols, carboxylic acids, and hydroxycarboxylic acids, was produced and subsequently extracted with aqueous sodium hydroxide solution. The degree of oxidation achieved by this treatment was equivalent to oxidizing the coal at 150°C. for a period of 8 weeks in shallow pans with frequent stirring. Treating coal with the aqueous catalyst suspension not only resulted in a remarkable degree of oxidation, but also seemed to activate the oxidizable sites whereby it was further oxidized by exposure to air in a minimum period of time and at low temperature.

A substantial amount of gas was liberated in the ball mill while treating the coal and a significant pressure was built up. The off gases contained hydrogen cyanide, cyanogen, hydrogen sulfide, sulfur dioxide, sulfur trioxide and carbon dioxide. The composition of the off gases indicated that the action of the catalyst suspension on the coal was one of oxidation.

A second portion of coal treated in the ball mill was extracted with acetone and then with benzene. Upon evaporating the solvents, a mixture of organic chemicals was obtained in each instance and it was not possible to determine the exact chemical composition. However, the compounds were different from those obtained upon extracting the treated coal with aqueous acetic acid and aqueous sodium hydroxide.

A third sample of the treated coal was analyzed. The treated coal contained substantially no alkali metal compounds or combustible sulfur and nitrogen compounds. The heating value was not changed significantly and the treated coal is a low sulfur and low nitrogen containing fuel which may be burned in coal burning furnaces. Upon combustion, the treated coal produces very little air pollution due to sulfur and nitrogen oxides and tube failure in furnaces is reduced to a minimum.

EXAMPLE III

This example illustrates the use of a catalyst prepared in accordance with Example I in treating fabrics to remove stubborn stains.

A standard household automatic washer (12 pounds capacity) was used in obtaining the data for this example. The recommended washing cycle for the stained fabrics was also used.

In one run, an attempt was made to remove chocolate stains from a cotton shirt using commercially available laundry detergents (laundry detergents sold under the trademarks Biz and Tide-XK) and an oxidizing agent (Clorox). The chocolate stains were not removed by this treatment. However, chocolate stains were easily removed in a second run when washing with a diluted catalyst suspension prepared in accordance with Example I.

In subsequent runs, two fluid ounces of a concentrated catalyst suspension prepared in accordance with Example I was added to the washer along with the recommended amount of cold water and the stained clothing. Blood, grape juice, catsup, grease and grass stains were removed. Even better results were obtained in further runs when using the catalyst suspension in combination with the recommended amount of a laundry detergent. It was not possible to remove stains of this type when using only a laundry detergent and Clorox.

The fabrics washed in water containing the catalyst suspension were softer. Thus, the catalyst suspension is useful as a fabric softener as well as a stain remover.

EXAMPLE IV

This example illustrates the preparation, testing and use of additional catalyst suspensions.

Five suspensions of catalysts were prepared from the same ingredients as used in Example I and following the general procedure of Example I. The ratios of ingredients were varied as follows:

| Ingredient | Amount of Ingredient | | | | |
|---|---|---|---|---|---|
| | Run 1 | Run 2 | Run 3 | Run 4 | Run 5 |
| Deionized Water | 2.0 l | 1.5 l | 1.5 l | 1.5 l | 0.25 l |
| $CaCl_2$ | 0.66 g | 0.5 g | 0.5 g | 1.0 g | 0.5 g |
| $MgSO_4 \cdot 7H_2O$ | 1.32 g | 1.0 g | 1.0 g | 2.0 g | 1.0 g |
| $Na_2SiO_3 \cdot 5H_2O$ | 165 g | 123 g | 71 g | 185 g | 71 g |
| Sulfated Castor Oil (approximately 50% by weight $H_2O$) | 100 ml | 150 ml | 150 ml | 200 ml | 150 ml |

The catalyst suspensions prepared by the above five runs were tested in accordance with Example II and were rated as superior catalysts. A portion of the catalyst suspension from each of the runs was frozen and thawed. When tested in accordance with the procedure of Example II, the frozen and thawed catalyst suspension had an even higher catalytic activity.

A portion of the frozen and thawed catalyst suspension from run 4 was evaporated to dryness and the dry residue was used to prepare an aqueous catalyst suspension. The catalyst suspension contained 1 part of the dry residue for each 600 parts of deionized water and it was an effective catalyst when tested in accordance with the procedure of Example II.

EXAMPLE V

This Example illustrates a further presently preferred process for preparing the catalyst of the invention.

Anhydrous calcium chloride in an amount of 0.66 gram and magnesium sulfate heptahydrate in an amount of 1.32 grams were dissolved in one liter of soft water heated to 80°C. Then 95 grams of sodium silicate pentahydrate was added to the resulting solution with stirring to produce a suspension of finely divided particles of the reaction product. The sodium silicate pentahydrate contained approximately 0.12 gram of aluminum when calculated as $Al_2O_3$ and a somewhat smaller amount of zinc when calculated as ZnO.

The suspension of the reaction product was maintained at 80°C. and stirred for one-half hour. Then an aqueous solution prepared by admixing 75 grams of sulfated castor oil with 100 mililiters of water was added slowly with stirring. The stirring was continued for one-half hour thereafter while maintaining the reaction mixture at 80°C. to produce catalyst-containing micelles.

The sulfated castor oil contained 6.5–7% of organically combined $SO_3$ on a dry basis, 0.9–1.1% of combined alkali when calculated as sodium oxide, no free alkali, and 50% $\mp$ 1% of material volatile at 105°C. which was mostly water. The average molecular weight of the sulfated castor oil molecule was approximately 400 grams per mole.

The above prepared suspension of catalyst was placed in plastic containers awaiting testing and use. The catalyst suspension was tested in accordance with Example II and was rated as a superior catalyst. It was possible to add from 1,000 to 10,000 parts of water to a portion of the catalyst suspension and still obtain excellent catalytic activity.

A further portion of the catalyst suspension was frozen and thawed, and then tested in accordance with the procedure of Example II. The cooling and warming steps enhanced the catalytic activity.

A further portion of the catalyst suspension was admixed with commercially available surfactants in quantities sufficient to serve as a laundry detergent. No detrimental effects were noted. It was also possible to add additional alkali metal silicate having a mole ratio of $SiO_2$ to $Na_2O$ of 1.6:1 to 3:1 without detrimental effects. Thus, the aqueous catalyst suspension is sufficiently stable to allow addition of laundry detergents or builders such as alkali metal silicates, nitrilotriacetic acid and phosphates.

EXAMPLE VI

The general procedure of Example V was followed with the exception of using 0.33 gram of anhydrous calcium chloride rather than 0.66 gram, 0.66 gram of magnesium sulfate heptahydrate rather than 1.32 grams, and 45 grams of sodium silicate pentahydrate rather than 95 grams. The remaining ingredients and steps in the Example I procedure for preparing the catalyst were not changed.

The resulting catalyst suspension was approximately one-half as concentrated as that prepared in Example V. Upon testing in accordance with Example II, it was found to be as effective as the catalyst of Example V when calculated on a dry solid basis. It was also possible to add surfactants and alkali metal silicates as described in Example V without adverse effect. Cooling the catalyst suspension to temperatures approaching the freezing point or freezing, followed by warming or thawing, also had a beneficial effect upon the catalytic activity.

I claim:

1. A process for preparing a catalyst comprising
   admixing a water soluble alkali metal silicate with an aqueous medium containing a dissolved substance which is a source of calcium ion and a dissolved substance which is a source of magnesium ion,
   the aqueous medium containing said dissolved substances in amounts to provide between about $1 \times 10^{-4}$ and $1 \times 10^{-1}$ mole per liter each of calcium ion and magnesium ion,
   the aqueous medium containing said dissolved substances in amounts to provide a molar ratio of calcium ion to magnesium ion between about 2.0:1.0 and 1.0:2.0;
   the alkali metal silicate having an alkali metal oxide to silicon dioxide ratio between about 0.9:1.0 and less than 2.0:1.0 and being admixed with the aqueous medium in an amount of about 0.05–2 moles per liter,
   reacting the alkali metal silicate with said dissolved substances providing calcium ion and magnesium ion to produce an aqueous suspension of finely divided particles of the reaction product,
   admixing a micelle-forming surfactant with the aqueous medium in an amount to form catalyst micelles comprising said finely divided particles of the reaction product upon agitating the aqueous medium, and
   agitating the aqueous medium containing said finely divided particles of the reaction product and surfactant to form said catalyst micelles.

2. The catalyst prepared by the process of claim 1.

3. The process of claim 1 wherein an aqueous medium containing said catalyst micelles is intimately contacted with a carbonaceous material having active sites to increase the initial catalytic activity thereof.

4. The catalyst prepared by the process of claim 3.

5. The process of claim 1 wherein said aqueous medium containing the dissolved substances which are sources of calcium ion and magnesium ion is prepared by admixing the substance which is a source of calcium ion and the substance which is a source of magnesium ion with an aqueous medium containing used catalyst.

6. The process of claim 1 wherein said aqueous medium containing the catalyst micelles is cooled to a temperature substantially below ambient temperature to increase the catalytic activity.

7. The process of claim 1 wherein said aqueous medium containing the catalyst micelles is frozen and then thawed to increase the catalytic activity.

8. The process of claim 1 wherein said ratio of calcium ion to magnesium ion is between about 1.5:1.0 and 1.0:1.5.

9. The process of claim 1 wherein said ratio of calcium ion to magnesium ion is about 1.0:1.0.

10. The process of claim 1 wherein the alkali metal silicate is admixed with an aqueous medium containing said dissolved substances in amounts to provide between about $1 \times 10^{-3}$ and $1 \times 10^{-2}$ mole per liter each of calcium ion and magnesium ion.

11. The process of claim 1 wherein the alkali metal silicate is admixed with an aqueous medium containing said dissolved substances in amounts to provide between about $3 \times 10^{-3}$ and $6 \times 10^{-3}$ mole per liter each of calcium ion and magnesium ion.

12. The process of claim 1 wherein about 0.1–1 mole per liter of the alkali metal silicate is admixed with the aqueous medium.

13. The process of claim 1 wherein about 0.2–0.5 mole per liter of the alkali metal silicate is admixed with the aqueous medium.

14. The process of claim 1 wherein the alkali metal silicate has an alkali metal oxide to silicon dioxide ratio between about 0.9:1.0 and 1.2:1.0.

15. The process of claim 1 wherein the alkali metal silicate is alkali metal metasilicate having an alkali metal oxide to silicon dioxide ratio of about 1.0:1.0.

16. The process of claim 1 wherein about 0.01–1 mole per liter of the surfactant is admixed with the aqueous medium.

17. The process of claim 1 wherein about 0.01–0.2 mole per liter of the surfactant is admixed with the aqueous medium.

18. The process of claim 1 wherein the surfactant comprises sulfated castor oil.

19. The process of claim 1 wherein the surfactant comprises sulfated castor oil and at least 25% of the hydroxy groups of the castor oil are sulfated.

20. The process of claim 1 wherein the alkali metal silicate is admixed with an aqueous medium containing said dissolved substances in amounts to provide between about $1 \times 10^{-3}$ and $1 \times 10^{-2}$ mole per liter each of calcium ion and magnesium ion, the ratio of calcium ion to magnesium ion is between about 1.5:1.0 and 1.0:1.5, about 0.1–1 mole per liter of the alkali metal silicate is admixed with the aqueous medium, and the alkali metal silicate has an alkali metal oxide to silicon dioxide ratio between about 0.9:1.0 and 1.2:1.0.

21. The process of claim 20 wherein the alkali metal silicate is sodium silicate.

22. The process of claim 20 wherein about 0.01–0.2 mole per liter of the surfactant is admixed with the aqueous medium.

23. The process of claim 22 wherein the surfactant comprises sulfated castor oil.

24. The process of claim 23 wherein the alkali metal silicate is sodium silicate.

25. The process of claim 24 wherein at least 50% of the hydroxy groups of the castor oil are sulfated, and about 0.03–0.1 mole per liter of the sulfated castor oil is admixed with the aqueous medium.

26. The process of claim 1 wherein the alkali metal silicate is admixed with an aqueous medium containing said dissolved substances in amounts to provide between about $3 \times 10^{-3}$ and $6 \times 10^{-3}$ mole per liter each of calcium ion and magnesium ion, the aqueous medium contains about equimolar amounts of calcium ion and magnesium ion, about 0.2–0.5 mole per liter of the alkali metal silicate is admixed with the aqueous medium, and the alkali metal silicate is alkali metal metasilicate having an alkali metal oxide to silicon dioxide ratio of about 1.0:1.0.

27. The process of claim 26 wherein the alkali metal metasilicate is sodium metasilicate having a sodium oxide to silicon dioxide ratio of about 1.0:1.0.

28. The process of claim 26 wherein about 0.01–0.2 mole per liter of the surfactant is admixed with the aqueous medium.

29. The process of claim 28 wherein the surfactant comprises sulfated castor oil.

30. The process of claim 29 wherein the alkali metal metasilicate is sodium metasilicate having a sodium oxide to silicon dioxide ratio of about 1.0:1.0.

31. The process of claim 30 wherein at least 50% of the hydroxy groups of the castor oil are sulfated, and about 0.03–0.1 mole per liter of the sulfated castor oil is admixed with the aqueous medium.

32. The process of claim 31 wherein the aqueous medium contains not more than 10 parts per million by weight of carbonate ion and bicarbonate ion.

33. The process of claim 1 wherein the aqueous medium containing said catalyst micelles is concentrated by evaporating water therefrom.

34. The process of claim 33 wherein sufficient water is evaporated to produce a solid residue of catalyst.

35. The solid residue of catalyst prepared by the process of claim 34.

36. The process of claim 1 wherein at the time of reacting the alkali metal silicate with the dissolved substances providing calcium ion and magnesium ion the aqueous medium contains at least one substance selected from the group consisting of alkali metal aluminate and alkali metal zincate.

37. The catalyst prepared by the process of claim 36.

38. The process of claim 36 wherein the aqueous medium contains an alkali metal aluminate.

39. The process of claim 38 wherein the alkali metal aluminate is present in an amount to provide about 0.01–0.5% by weight when calculated as $Al_2O_3$ and based upon the weight of the alkali metal silicate.

* * * * *